United States Patent [19]
Layer

[11] Patent Number: 5,799,954
[45] Date of Patent: Sep. 1, 1998

[54] COAXIAL SEALING RING

[75] Inventor: Jeffrey F. Layer, Woodbind, Md.

[73] Assignee: EG&G Pressure Science, Inc., Beltsville, Md.

[21] Appl. No.: 783,832

[22] Filed: Jan. 13, 1997

[51] Int. Cl.$^6$ .................................................. F16L 17/06
[52] U.S. Cl. .......................... 277/614; 277/615; 277/626
[58] Field of Search .............................. 277/200, 206 R, 277/213, 236, 167.5

[56] References Cited

U.S. PATENT DOCUMENTS

| | | | |
|---|---|---|---|
| 805,645 | 11/1905 | Guillott | 277/213 |
| 1,695,995 | 12/1928 | Coulston | 277/167.5 |
| 2,248,385 | 7/1941 | Reynolds | 277/236 |
| 2,569,778 | 10/1951 | Phillips | 277/200 |
| 2,638,393 | 5/1953 | Phillips | 277/213 |
| 3,012,802 | 12/1961 | Waite | 277/236 |
| 3,204,971 | 9/1965 | Meriano | 277/171 |
| 3,240,501 | 3/1966 | Smith | 277/213 |
| 3,272,521 | 9/1966 | McNenny | 277/205 |
| 3,520,544 | 7/1970 | Taylor | 277/206 |
| 3,595,588 | 7/1971 | Rode | 277/206 R |
| 3,633,928 | 1/1972 | Smith | 277/206 R |
| 4,067,585 | 1/1978 | Rode | 277/200 |
| 4,121,843 | 10/1978 | Halling | 277/200 |
| 4,350,346 | 9/1982 | Fowler | 277/200 |
| 4,361,335 | 11/1982 | Vinciguerra | 277/204 |
| 4,457,523 | 7/1984 | Halling et al. | 277/236 |
| 4,477,086 | 10/1984 | Feder et al. | 277/26 |
| 4,744,572 | 5/1988 | Sahba et al. | 277/236 |
| 4,779,901 | 10/1988 | Halling | 285/184 |
| 4,798,392 | 1/1989 | Tozer | 277/200 |
| 4,854,600 | 8/1989 | Halling et al. | 277/236 |
| 5,249,814 | 10/1993 | Halling | 277/206 R |
| 5,435,576 | 7/1995 | Rode | 277/236 |

FOREIGN PATENT DOCUMENTS

| | | | |
|---|---|---|---|
| 0969210 | 6/1975 | Canada | 277/236 |
| 0444217 | 3/1936 | United Kingdom | 277/236 |

OTHER PUBLICATIONS

Drawing of a Wave Seal, drawn by Jeffrey F. Layer—sold prior to Jan., 1996.

*Primary Examiner*—Thomas B. Will
*Assistant Examiner*—John L. Beres
*Attorney, Agent, or Firm*—Roylance, Abrams, Berdo & Goodman, L.L.P.

[57] ABSTRACT

A sealing ring is disclosed for radially sealing two coaxial surfaces. The sealing ring has an annular convolution with a first radially facing sealing surface and a pair of annular leg portions forming second and third radially facing sealing surfaces. Each of the leg portions are provided with an annular bend to increase the radial resiliency of the seal. In an alternate embodiment, each of the leg portions of the sealing ring has a pair of annular bends. In yet another embodiment, the sealing ring is constructed of a pair of plies or layers.

22 Claims, 5 Drawing Sheets

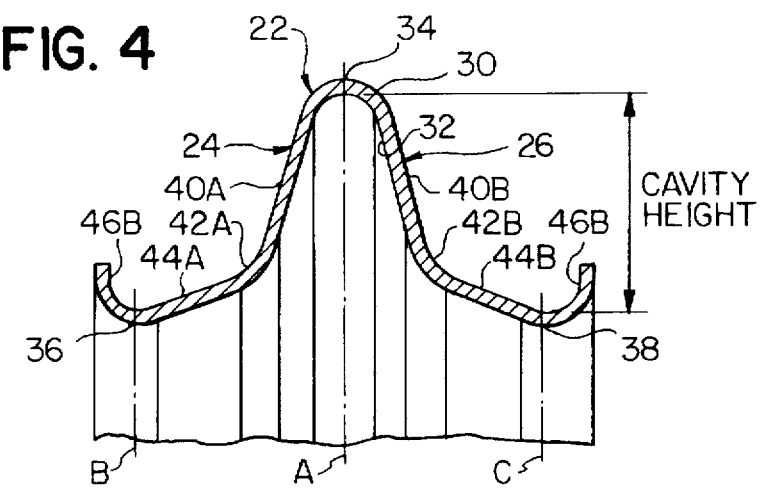
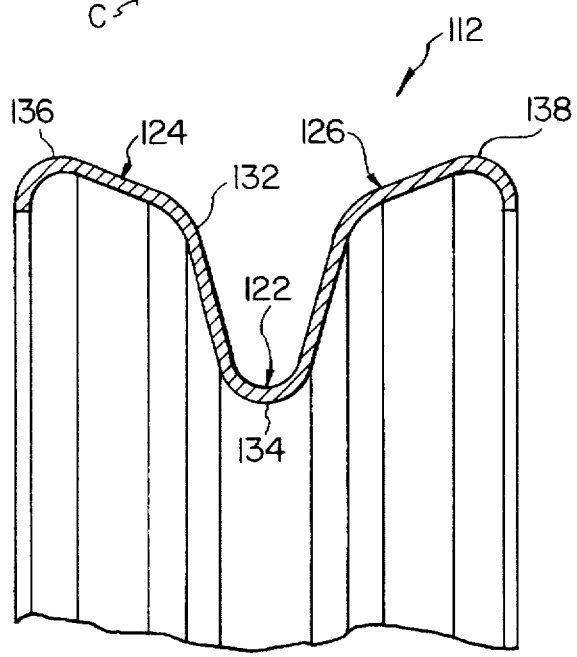
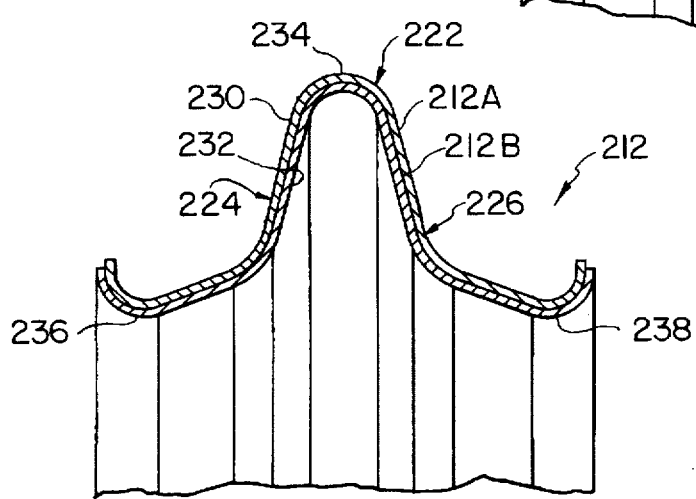

ms# 5,799,954

COAXIAL SEALING RING

FIELD OF THE INVENTION

The present invention relates to fluid-tight sealing rings for use in fluid containment systems, especially in pneumatic applications such as turbine engine applications. More specifically, the present invention relates to a radial sealing ring for radially sealing two coaxial surfaces relative to one another.

BACKGROUND OF THE INVENTION

Resilient, metallic sealing rings are currently utilized in a wide variety of applications due to their ability to repeatedly accommodate large variations in lengths due to thermal expansions and contractions of assemblies surrounding them and/or engaging them in sealing contact. For example, in the hot sections of an aircraft gas turbine engine, a seal is often utilized between a pair of concentric, annular bodies or members having high temperature and pressure fluid flowing therethrough. These sealing rings have numerous configurations, usually depending upon the cavity to be sealed. Moreover, a seal must be created between components that are at variable distances from one another, depending upon the manufacturing tolerances of the components in the assembly as well as the relative thermal expansion during operation of the assembly. The sealing ring must be capable of conforming to out-of-flat surfaces to provide low leakage.

Accordingly, numerous types and shapes of seals have been employed to prevent fluid from escaping from a joint or connection in ducting systems or other components. While these seals are effective in many situations, a need has long existed for a resilient, metallic sealing ring capable of maintaining a tight seal between two cylindrical surfaces that can accommodate expansions at different rates due to differences in their temperatures and/or their coefficients of thermal expansion. The basic problem with providing such a seal is that the expansion of the cylindrical surfaces tend to compress the seal beyond its elastic range, and thus, the seal does not recover to a sealing configuration once the expansion cycle is completed. In other words, the cross-sectional width of the sealing ring is permanently decreased, thereby causing leakage to commence almost as soon as the differential expanded cylindrical surfaces begin to return to their original dimensions. This is usually caused by significant bending deflections in the seals.

Examples of prior art sealing rings are disclosed in U.S. Pat. Nos.: 3,012,302 to Waite; 3,204,971 to Meriano; 3,272,521 to McNenny; 3,520,544 to Taylor; 3,595,588 to Rode; 3,633,928 to Smith; 4,067,585 to Rode; 4,121,843 to Halling; and 4,457,523 to Halling et al.

Accordingly, in view of the above, it is apparent to those skilled in the art that there exists a need for a sealing ring which provides superior performance at low manufacturing costs, that maintains current standards for leakage control while accommodating greater surface distortion than prior sealing rings. The present invention addresses these needs in the art, along with other needs, which will become apparent to those skilled in the art once given this disclosure.

SUMMARY OF THE INVENTION

Accordingly, one object of the present invention is to provide a sealing ring having superior resiliency in both the axial and radial directions.

Another object of the present invention is to provide a sealing ring with low maximum stress levels.

Still another object of the present invention is to provide a sealing ring having superior performance at lower manufacturing costs.

Yet another object of the present invention is to provide a sealing ring having increased deflection capabilities to accommodate the large thermal expansion occurring in modern turbine engines without loss of resiliency due to stress, relaxation or failure due to fatigue.

The foregoing objects are basically attained by providing a sealing ring for sealing two coaxial surfaces relative to one another, comprising an annular convolution portion having a first end and a second end with a convex surface and a concave surface extending therebetween, and convex surface forming a first radial sealing surface facing in a first radial direction; a first annular leg portion extending outwardly from the first end of the convolution portion to a first free end, and having a second radial sealing surface facing in a second radial direction substantial opposite to the first radial sealing surface of the convolution portion and a first annular bent section located between the second radial sealing surface and the convolution portion; and a second annular leg portion extending outwardly from the second end of the convolution portion to a second free end, and having a third radial sealing surface facing in the second radial direction and a second annular bent section located between the third radial sealing surface and the convolution portion.

Advantageously, the three sealing portions are substantially semi-circular in cross-section. It will be apparent to those skilled in the art from this disclosure that the sealing surface of the convolution portion can either engage and seal the outer component or the inner component, while the sealing surfaces of the leg portions can either engage and seal the inner component or the outer component as seen in the attached drawings.

Moreover, it will be apparent those skilled in the art from this disclosure that sealing rings in accordance with the present invention can be constructed of one or more plies as needed and/or desired. Of course, using additional plies of thinner material allows for increased elastic deflection yet still generates a large enough force to provide a good seal. Accordingly, it may be desirable to have a multi-ply seal in certain applications.

Other objects, advantages and salient features of the present invention will become apparent from the following detailed description which, taken in conjunction with the annexed drawings, discloses preferred embodiments of the present invention.

BRIEF DESCRIPTION OF THE DRAWINGS

Referring now to the attached drawings which form part of this original disclosure:

FIG. 4 is an enlarged, partial longitudinal cross-sectional view of the sealing ring illustrated in FIGS. 1–3, taken along section line 4—4 of FIG. 3;

FIG. 5 is a partial longitudinal cross-sectional view of a sealing ring in accordance with a second embodiment of the present invention;

FIG. 6 is a partial longitudinal cross-sectional view of a two ply sealing ring in accordance with a third embodiment of the present invention;

DETAILED DESCRIPTION OF THE PREFERRED EMBODIMENTS

Figure 1:
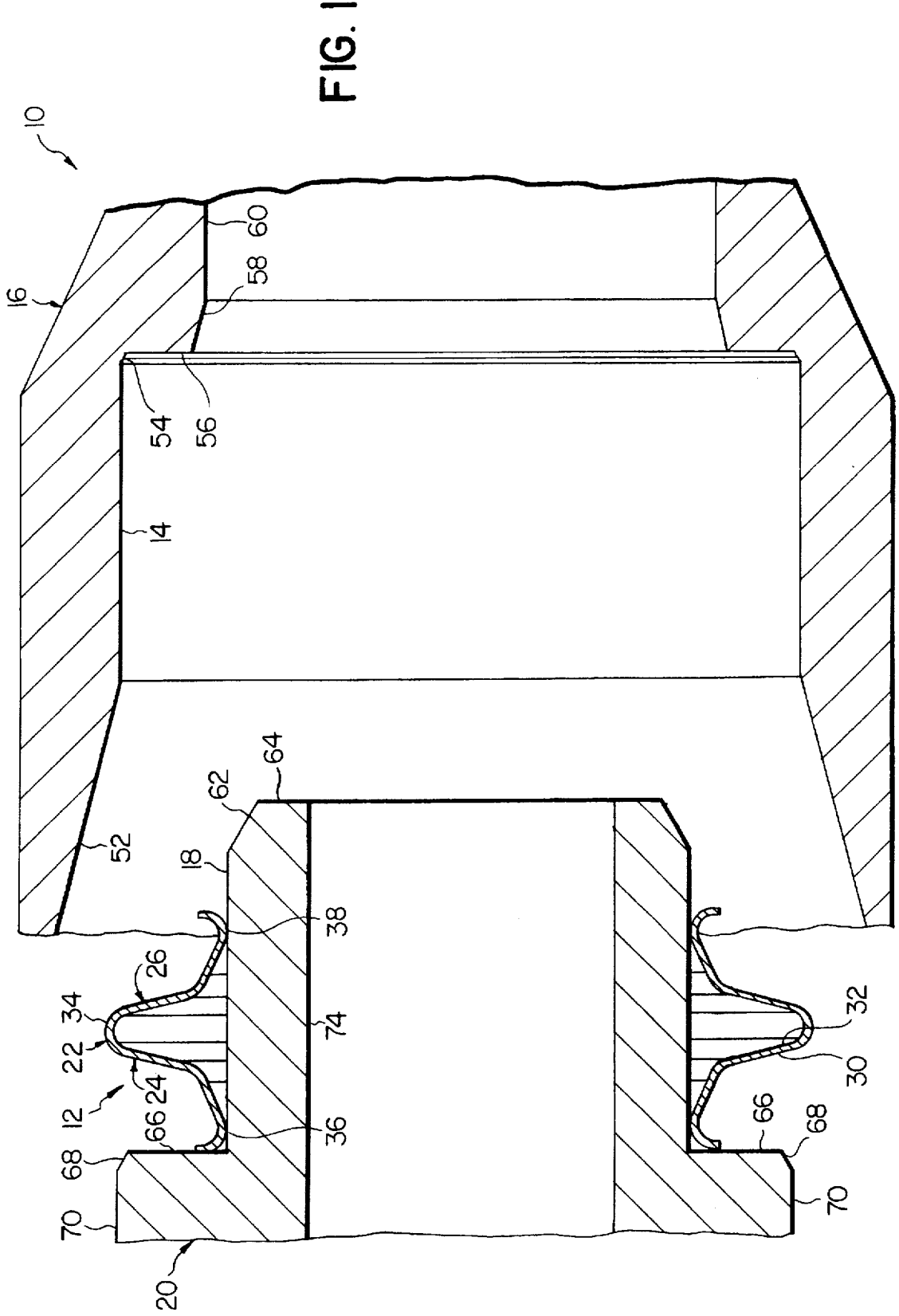
FIG. 1 is an exploded, partial longitudinal cross-sectional view of the coaxial sealing ring and a pair of coaxial members in accordance with a first embodiment of the present invention.
Figure 2:
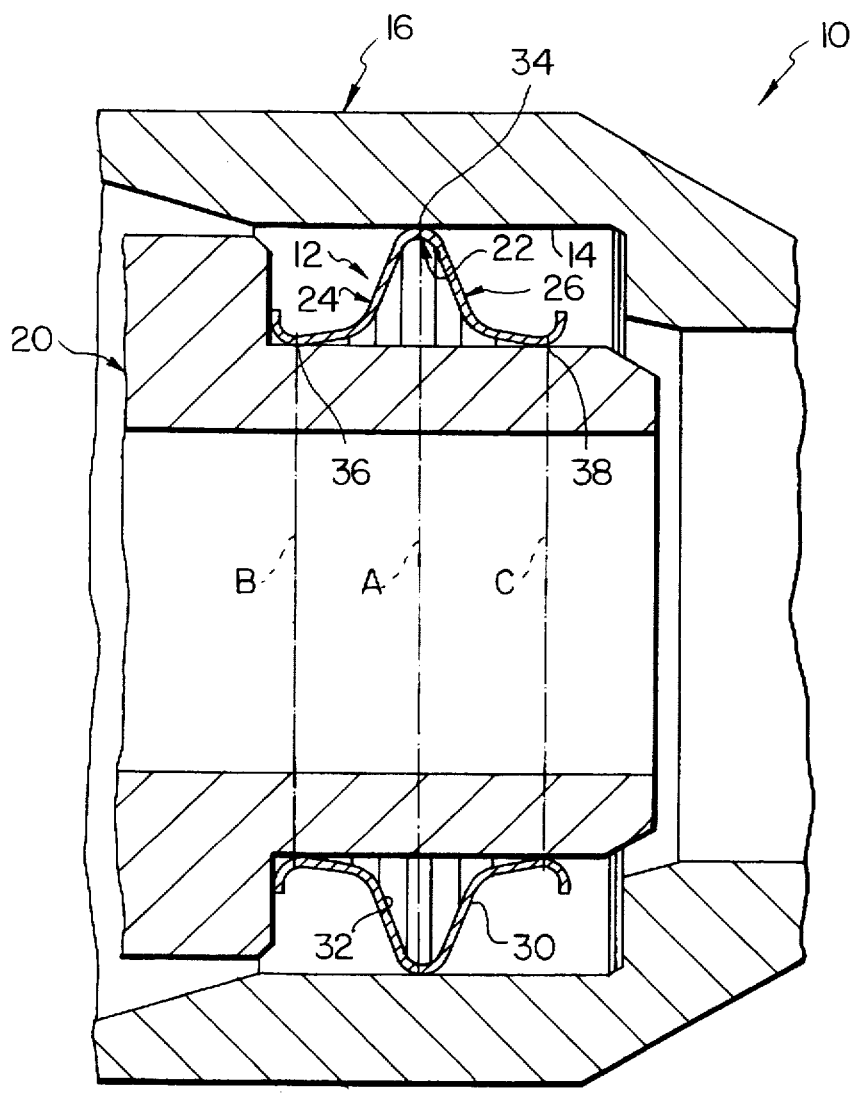
FIG. 2 is a partial longitudinal cross-sectional view of a coaxial sealing ring in accordance with a first embodiment of the present invention installed between a pair of coaxial members.
Figure 3:
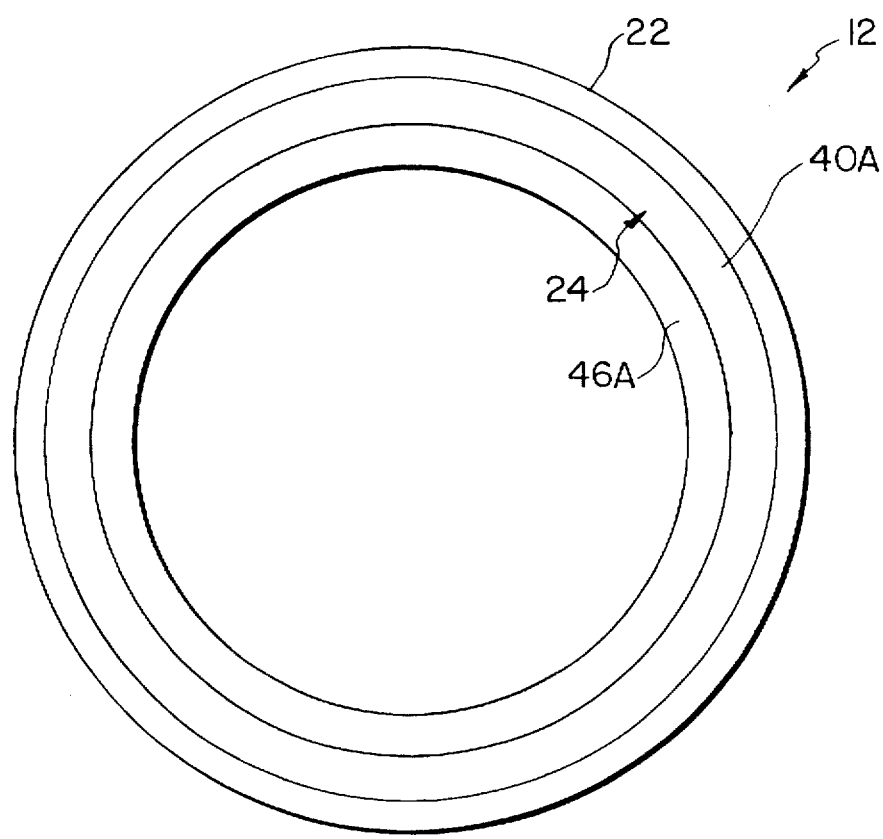
FIG. 3 is a side elevational view of a sealing ring illustrated in FIGS. 1 and 2 in accordance with a first embodiment of the present invention.

Referring initially to FIGS. 1–3, a sealing assembly 10 in accordance with a first embodiment of the present invention is illustrated. Sealing ring assembly 10 includes a metallic, resilient sealing ring 12 for use in sealing against a first cylindrical surface 14 on the inner surface of a first outer hollow annular body or component 16, and a second concentric cylindrical surface 18 on the outer surface of a second inner hollow annular body or component 20. Sealing ring 12 is designed to be radially compressed and axially expanded when installed between components 16 and 20 to create a fluid tight seal therebetween.

Sealing ring 12 is preferably constructed as a one-piece, unitary member which includes an annular convolution portion 22, a first annular leg portion 24 extending from one end of convolution portion 22 to a free end, and a second annular leg portion 26 extending from the other end of convolution portion 22 to a free end. Of course, sealing ring 12 can be constructed of more than one ply and may be coated with a wear coating as mentioned below.

Sealing ring 12 has an exterior surface 30 facing generally radially outwardly towards first cylindrical surface 14 of component 16, and an interior surface 32 facing generally radially inwardly towards second cylindrical surface 18 of component 20. Exterior surface 30 along convolution portion 22 forms a first radial sealing surface 34 with a curved cross-section for engaging and sealing against first inner surface 14 of component 16. Interior surface 32 of each of the first and second leg portions 24 and 26 form second and third radial sealing surfaces 36 and 38 with curved cross-sections which engage and seal against second outer surface 18 of component 20. Accordingly, the interface between first radial sealing surface 34 of convolution portion 22 and first inner cylindrical surface 14 of component 16 forms a first sealing line A. The interfaces between second and third radial sealing surfaces 36 and 38 of leg portions 24 and 26, respectively, and second outer cylindrical surface 18 form second and third cylindrical sealing lines B and C.

Sealing ring 12 is preferably constructed of a resilient, metallic material. Depending upon the application, sealing ring has a thickness of approximately 0.008 inch to approximately 0.012 inch thick. Of course, any suitable thickness from a manufacturing or contact load standpoint can be utilized. The metallic material of sealing ring 12 is preferably constructed of any high, temperature resilient material such as an INCONEL, WASPALLOY or any high temperature stainless steel, as well as any newly high temperature, resilient material. In one application, sealing ring 12 can be a thirty inch diameter ring constructed of INCONEL 718 with a 0.008 inch thickness.

Convolution portion 22 is preferably shaped as a partial circle when viewed in longitudinal cross-section as seen in FIGS. 1, 2 and 4. Convolution portion 22 preferably extends through an arc of at least approximately 120° and preferably in the range of approximately 120° to 170°. For example, convolution portion 22 can extend through an arc of approximately 150°. As mentioned above, first curved sealing surface 34 is formed on the exterior surface 30 of convolution portion 22. Accordingly, in this embodiment, the inner surface of convolution portion 22 is concaved, while the outer surface of convolution portion 22 is convex. Of course, in other embodiments, convolution portion 22 is inverted as such that its concaved surface faces radially outwardly and its convex surface faces radially inwardly.

Referring to FIG. 4, leg portions 24 and 26 are substantially identical to each other, except that leg portions 24 and 26 are mirror images of each other. Leg portion 24, as viewed in longitudinal cross-section, has a first substantially straight planar section 40A extending from one end of convolution portion 22, a curved or bent section 42A extending from first planar section 40A, a second planar section 44A extending outwardly from bent section 42A, and a second curved section 46A extending from curved section 44A and forming second radial sealing surface 36 for contacting second cylindrical surface 18 of second component 20 to form an annular fluid-tight seal therebetween.

Likewise, second leg portion 26, as viewed in longitudinal cross-section, includes a first substantially straight planar section 40B extending from the other end of convolution portion 22, a first curved or bent section 42B extending from planar section 40B, a second planar section 44B extending from bent section 42B, and a second curved section 46B extending from second planar section 44B and forming third radial sealing surface 38 for contacting second cylindrical surface 18 of second component 20 to form an annular fluid-tight seal therebetween.

First planar sections 40A and 40B are frustoconical rings as viewed in elevation and diverge away from each other as they extend from convolution portion 22 to bent sections 42A and 42B. Preferably, first planar sections are angled approximately 10° to approximately 60° apart from each other so that when sealing ring 12 is radially compressed, first planar sections 40A and 40B are deflected outwardly relative to each other causing sealing ring 12 to expand in the axial direction. Accordingly, a certain amount of stress occurring during radial and axial deflections of sealing ring 12 is concentrated within convolution portion 22. This can be readily seen by comparing sealing ring 12 in its unstressed state as seen in FIG. 1 to sealing ring 12 in its stressed or compressed state as seen in FIG. 2. In particular, radial compression of sealing ring 12 causes convolution portion to bend so that planar sections 40A and 40B spread apart from each other to decrease the radial dimension of sealing ring 12.

Also, a portion of the stress of sealing ring 12 due to its radial compression is concentrated in bent sections 42A and 42B. More specifically, as sealing ring 12 is radially compressed, bent sections 42A and 42B are also deflected so that second planar sections 44A and 44B together with curved sections 46A and 46B are bent radially and outwardly relative to bent sections 42A and 42B. Accordingly, when sealing ring 12 is radially compressed, the stress due to such deflection not only occurs in convolution portion 22 but also occurs in bent sections 42A and 42B. This arrangement distributes the stress over a greater area of sealing ring 12 than in the prior art wave seal. Preferably, curved sections 42A and 42B each have a curvature of approximately 40° to approximately 60° between planar sections 40A and 40B and planar sections 44A and 44B, respectively.

As viewed in elevation, second planar sections 44A and 44B are substantially frustoconical rings which interconnect curved sections 42A and 42B to curved sections 46A and 46B, respectively. Preferably, the outside angle between first planar sections 42A and 42B and second planar sections 44A and 44B, respectively, is approximately 120° to approximately 140° in the unstressed state. As seen by comparing the unstressed sealing ring 12 of FIG. 1 to sealing ring 12 in its compressed state of FIG. 2, planar sections 44A and 44B become flatter and move axial when sealing 12 is compressed.

As mentioned above, curved sections 46A and 46B form radial sealing surfaces 36 and 38, respectively for engaging second outer surface 18 of second component 20 to form an annular fluid tight seal therebetween. Curved sections 46A and 46B preferably have a curvature of approximately 110°.

As will be apparent to those skilled in the art from this disclosure, "substantially smooth surface" as used herein is intended to include flat surfaces as well as curved surfaces which are free of any abrupt transitions, i.e., sharp bends, and which appear to be visibly smooth. In other words, a "substantially smooth surface" can include surfaces which appear rough under a magnifying instrument.

Also, as will be apparent to those skilled in the art from this disclosure, sealing ring 12 can be coated with a plasma spray wear coating having a low coefficient of friction and good abrasive wear properties.

It will also be apparent to those skilled in the art that the overall resiliency of sealing ring 12 can be modified by constructing sealing ring 10 with multi-plies as disclosed in one of the later embodiments. For example, by increasing the number of plies, but maintaining the same overall thickness, the contact force and the stress level in the convolution portion 22, bent sections 42A and 42B will be decreased as compared with a sealing ring of a lower number of plies but with the same overall thickness. In other words, a single ply material will have a higher contact force and a higher stress level in the convolution portion 22 and the curved or bent sections 42A and 42B, then a two ply seal with the same overall thickness wherein each of the plies of the two ply seal is half as thick as the single ply seal.

Sealing ring 12 can be installed between a pair of concentric components in various ways, including but not limited to, using a tool or heat to expand the cavity and/or seal diameters. Referring again to FIGS. 1 and 2, by way of example, first component 16 is tubular member which includes in addition to inner cylindrical surface 14, a downwardly and inwardly tapering frustoconical surface 52 that tapers at about 6° 30'. This taper is an assembly aid and can be up to about 15° as desired. Below inner cylindrical surface 14 is a curved annular surface 54 that extends into an axially facing annular surface 56 which in turn extends into a downwardly and inwardly tapering frustoconical surface 58. This frustoconical surface 58 tapers at an angle substantially equal to the angle of the taper of frustoconical surface 52. Frustoconical surface 58 extends into an inwardly facing cylindrical surface 60 through which the high temperature and pressure fluid flows.

The second inner component 20, located at the end of the radially outwardly facing cylindrical surface 18, includes a downwardly and inwardly tapering frustoconical surface 62 which leads to an annular axially facing surface 64. Above cylindrical surface 18 is an axially facing annular surface 66 extending substantially perpendicular to surface 18. Above surface 66 is a downwardly and inwardly taper frustoconical surface 68 which leads into an outwardly facing cylindrical surface 70 as seen in FIGS. 1 and 2. Second component 20 is a hollow tubular member with a center cylindrical bore 74 with a flow-through end defining annular surface 64 so that the high pressure and temperature flowing through first component 16 can pass therethrough and into second component 20 without fluid leaking therefrom.

ASSEMBLY AND OPERATION

To assembly sealing assembly 10, sealing ring 12 is first received on the cylindrical surface 18 of second component 20 with a minimum interference fit of about 0.002 inch as shown in FIG. 1. Then, first component 16 is moved axially towards second component 18 so that first curved sealing surface 34 of convolution portion 22 engages frustoconical surface 52 of first component 16. Continued axial movement of first component 16 towards second component 20 will cause sealing ring 12 to be radially inwardly deflected into a pre-loaded condition until first sealing surface 34 is fully received in the cylindrical surface 14 of first component 16 as seen in FIG. 2. This axial movement is continued until sealing ring 12 is enclosed in the cavity defined by surfaces 14, 18, 56 and 66 with sufficient axial clearance to permit operating axial movement of first and second components 16 and 20 without causing axial compression of sealing ring 12 as seen in FIG. 2. First and second components 16 and 18 are then connected in any conventional manner which allows relative axial movement due to thermal expansion or other mechanical movement, but not enough to axially crush sealing ring 12.

In the position as seen in FIG. 2, the compressed sealing ring 12 establishes a first sealing line A between first outer surface 14 and first curved sealing surface 34 of convolution portion 22 and second and third sealing lines B and C between second outer surface 18 and second and third curved sealing surfaces 36 and 38, respectively. Thus, sealing ring 12 effectively seals the cavity defined by the opposed cylindrical surfaces 14 and 18.

SECOND EMBODIMENT

Referring now to FIG. 5, a sealing ring 112 in accordance with a second embodiment of the present invention is illustrated. Basically, sealing ring 112 is similar to sealing ring 12 as discussed above, except that sealing ring 112 has been inverted as explained below, and can be installed between components 16 and 20. Accordingly, sealing ring 112 will not be discussed or illustrated in detail herein.

Sealing ring 112 includes an annular convolution portion 122, a first annular leg portion 124 extending from one end of convolution portion 122 to a free end, and a second annular leg portion 126 extending from the other end of convolution portion 122 to a free end. Accordingly, sealing ring 112 has an interior surface 130 facing generally radially inwardly for engagement with cylindrical surface 18 of component 20, and an exterior surface 132 facing generally radially outwardly for engagement with cylindrical surface 14 of component 16.

Interior surface 130 along convolution portion 122 forms a first radial sealing surface 134 for engaging and sealing against second cylindrical surface 18 of component 20. Exterior surface 132 of each of the first and second leg portions 124 and 126 form second and third radial sealing surfaces 136 and 138 which engage and seal against first cylindrical surface 14 of component 16. Accordingly, if sealing ring 112 were installed between components 16 and 20, as discussed above, then the interface between first curved sealing surface 134 of convolution portion 122 and first outer surface 18 of component 20 would form first sealing line A as seen in FIG. 2, while the interfaces between second and third curved sealing surfaces 136 and 138 of leg portions 124 and 126, respectively, and inner surface 14 would form second and third cylindrical sealing lines B and C as seen in FIG. 2.

THIRD EMBODIMENT

Referring now to FIG. 6, a sealing ring 212 in accordance with a third embodiment of the present invention is illustrated. Basically, sealing ring 212 is a two ply sealing ring having a pair of layers 212A and 212B. Sealing ring 212 is similar to sealing rings 12 and 112 as discussed above, except that sealing ring 212 is constructed from a pair of layers 212A and 212B, and can be installed between components 16 and 20. Accordingly, sealing ring 212 will not be discussed or illustrated in detail herein.

Basically, sealing ring 212 includes an annular convolution portion 222, a first annular leg portion 224 extending from one end of convolution portion 222 to a free end, and a second annular leg portion 226 extending from the other end of convolution portion 222 to a free end. Accordingly, sealing ring 212 has an exterior surface 230 formed by layer 212A which faces generally radially outwardly for engaging first cylindrical surface 14 of component 16, and an interior surface 232 formed by layer 212A which faces generally radially inwardly for engaging second cylindrical surface 18 of component 20.

Exterior surface 230 along convolution portion 222 forms a first radial sealing surface 234 on layer 212A for engaging and sealing against first inner cylindrical surface 14 of component 16. Interior surface 232 of each of the first and second leg portions 224 and 226 form second and third radial sealing surfaces 236 and 238 on layer 212B which engage and seal against second outer cylindrical surface 18 of component 20. Accordingly, if sealing ring 212 were installed between components 16 and 20, as discussed above, then the interface between first curved sealing surface 234 of convolution portion 222 and first inner surface 14 of component 16 would form first sealing line A as seen in FIG. 2, while the interfaces between second and third curved sealing surfaces 236 and 238 of leg portions 224 and 226, respectively, and second outer surface 18 would form second and third cylindrical sealing lines B and C as seen in FIG. 2.

FOURTH EMBODIMENT

Figure 7:
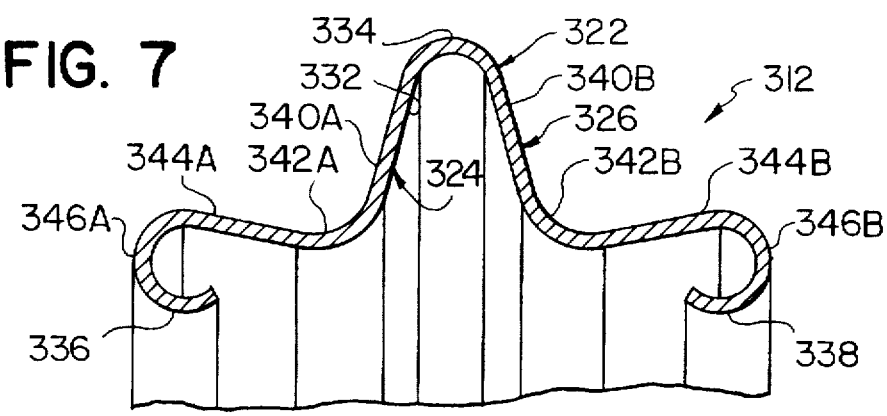
FIG. 7 is a partial longitudinal cross-sectional view of a sealing ring in accordance with a fourth embodiment of the present invention.

Referring now to FIG. 7, a sealing ring 312 in accordance with a fourth embodiment of the present invention is illustrated. Sealing ring 312 is a slightly modified version of sealing ring 12 discussed above, and can be installed between components 16 and 20. Accordingly, sealing ring 312 will not be discussed or illustrated in detail herein. Sealing ring 312 includes an annular convolution portion 322, a first annular leg portion 324 extending from one end of convolution portion 322 to a free end, and a second annular leg portion 326 extending from the other end of convolution portion 322 to a free end.

In this embodiment, sealing ring 312 has an exterior surface 330 and an interior 332, with exterior surfaces 330 forming each of the radial sealing surfaces 334, 336 and 330. More specifically, exterior surface 330 facing generally radially outwardly towards first cylindrical surface 14 of component 16, except at its free ends where it curves back upon itself so as to face radially inwardly for engaging second cylindrical surface 18 of component 20. Exterior surface 330 along convolution portion 322 form a first curved sealing surface 334 for engaging and sealing against first cylindrical surface 14 of component 16, while first and second leg portions 324 and 326 along exterior surface 330 form second and third curved sealing surfaces 336 and 338 which engage and seal against second cylindrical surface 18 of component 20. Accordingly, if sealing ring 310 were installed between components 16 and 20, then the interface between first curved sealing surface 334 of convolution portion 322 and first cylindrical surface 14 of component 16 would form first sealing line A as seen in FIG. 2, while the interfaces between second and third curved sealing surfaces 336 and 338 of leg portions 324 and 326, respectively, and second cylindrical surface 18 would form second and third cylindrical sealing lines B and C as seen in FIG. 2.

Moreover, each of the first and second leg portions 324 and 326 has a pair of bending sections, while each of the first and second leg portions of the first embodiment only has one bending section. In particular, leg portion 324, as viewed in longitudinal cross-section, has a first substantially straight planar section 340A extending from one end of convolution portion 322, a first curved or bent section 342A extending from first planar section 340A, a second planar section 344A extending outwardly from first bent section 342A, and a second curved section 346A extending from curved section 344A and forming second radial sealing surface 336 for contacting second cylindrical surface 18 of second component 20 to form an annular fluid-tight seal therebetween.

Likewise, second leg portion 326, as viewed in longitudinal cross-section, includes a first substantially straight planar section 340B extending from the other end of convolution portion 322, a first curved or bent section 342B extending from planar section 340B, a second planar section 344B extending from bent section 342B, and a second curved section 346B extending from second planar section 344B and forming third radial sealing surface 338 for contacting second cylindrical surface 18 of second component 20 to form an annular fluid-tight seal therebetween.

In addition to bent sections 342A and 342B, the intersections of second planar sections 344A and 344B with second curved section 346A and 346B form two additional bending points within first and second leg portions 324 and 326 to allow sealing ring 312 to be compressed radially when installed between components 16 and 20 of FIGS. 1 and 2.

FIFTH EMBODIMENT

Figure 8:
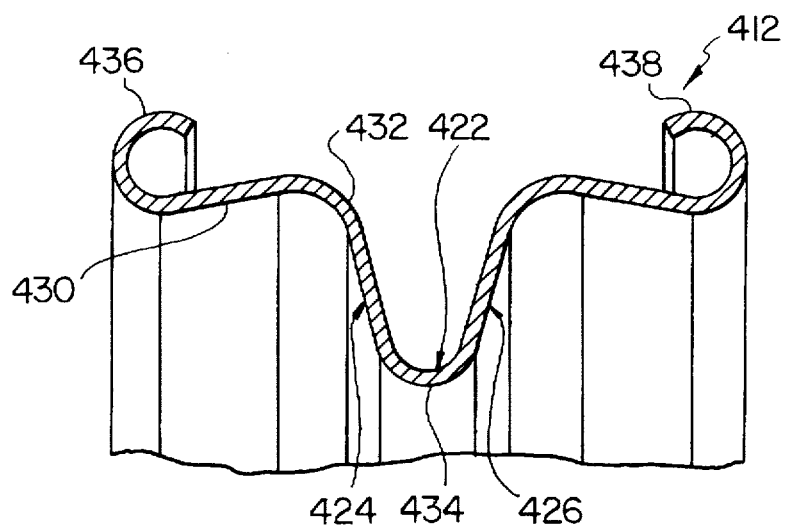
FIG. 8 is a partial longitudinal cross-sectional view of a sealing ring in accordance with a fifth embodiment of the present invention.

Referring now to FIG. 8, a sealing ring 412 in accordance with a fifth embodiment of the present invention is illustrated. Sealing ring 412 is substantially identical to sealing ring 312, except that it has been inverted similar to sealing ring 112. Moreover, sealing ring 412 can be installed between components 16 and 20 in substantially the same manner as discussed above. Accordingly, sealing ring 412 will not be discussed or illustrated in detail herein.

Sealing ring 412 includes an annular convolution portion 422, a first annular leg portion 424 extending from one end of convolution portion 422 to a free end, and a second annular leg portion 426 extending from the other end of convolution portion 422 to a free end. In this embodiment, sealing ring 412 has an interior surface 430 and an exterior 432, with interior surfaces 430 forming each of the radial sealing surfaces 434, 436 and 430. More specifically, interior surface 430 facing generally radially inwardly towards second cylindrical surface 18 of component 20, except at its free ends where it curves back upon itself so as to face radially outwardly for engaging first cylindrical surface 14 of component 16. Interior surface 430 along convolution portion 422 form a first curved sealing surface 434 for engaging and sealing against second cylindrical surface 18 of component 20, while first and second leg portions 424 and 426 along interior surface 430 form second and third curved sealing surfaces 436 and 438 which engage and seal against first cylindrical surface 14 of component 16. Accordingly, if sealing ring 410 were installed between components 16 and 20, then the interface between first curved sealing surface 434 of convolution portion 422 and first cylindrical surface 14 of component 16 would form first sealing line A as seen in FIG. 2, while the interfaces between second and third curved sealing surfaces 436 and 438 of leg portions 424 and 426, respectively, and second cylindrical surface 18 would form second and third cylindrical sealing lines B and C as seen in FIG. 2.

SIXTH EMBODIMENT

Figure 9:
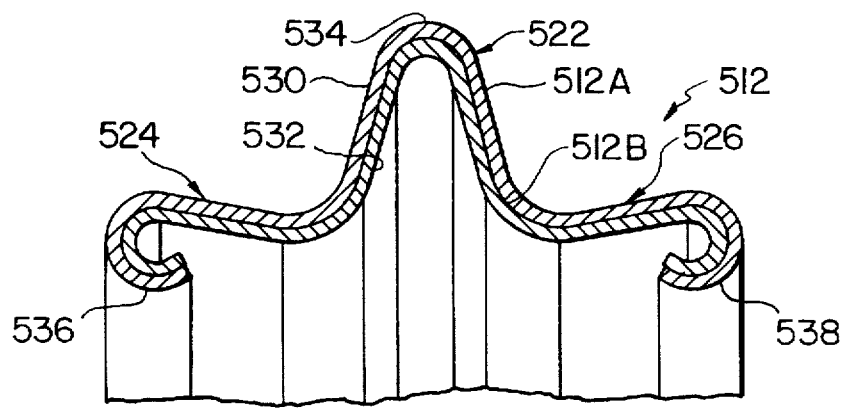
FIG. 9 is a partial longitudinal cross-sectional view of a sealing ring in accordance with a sixth embodiment of the present invention.

Referring now to FIG. 9, a sealing ring 512 in accordance with a sixth embodiment of the present invention is illustrated. Sealing ring 512 is a two ply sealing ring which is similar to sealing rings 312 and 412, discussed above, except that sealing ring 512 is constructed from a pair of layers 512A and 512B. Moreover, sealing ring 412 can be installed between components 16 and 20 in substantially the same manner as discussed above. Accordingly, sealing ring 512 will not be discussed or illustrated in detail herein.

Sealing ring 512 basically includes an annular convolution portion 522, a first annular leg portion 524 extending from one end of convolution portion 522 to a free end, and a second annular leg portion 526 extending from the other end of convolution portion 522 to a free end. In this embodiment, sealing ring 512 has an exterior surface 530 and an interior 532, with exterior surfaces 530 forming each of the radial sealing surfaces 534, 536 and 530. More specifically, exterior surface 530 is formed by layer 512A which faces generally radially outwardly for engaging first cylindrical surface 14 of component 16, except at its free ends where it curves back upon itself so as to face radially inwardly for engaging second cylindrical surface 18 of component 20. Exterior surface 530 of layer 512A along convolution portion 522 forms a first curved sealing surface 534 for engaging and sealing against first cylindrical surface 14 of component 16, while exterior surface 530 of layer 512A along first and second leg portions 524 and 526 forms second and third curved sealing surfaces 536 and 538 which engage and seal against second cylindrical surface 18 of component 20. Accordingly, if sealing ring 510 were installed between components 16 and 20, then the interface between first curved sealing surface 534 of convolution portion 522 and first cylindrical surface 14 of component 16 would form first sealing line A as seen in FIG. 2, while the interfaces between second and third curved sealing surfaces 536 and 538 of leg portions 524 and 526, respectively, and second cylindrical surface 18 would form second and third cylindrical sealing lines B and C as seen in FIG. 2.

While various embodiments have been chosen to illustrate the present invention, it will be understood by those skilled in the art from this disclosure that various changes and modifications can be made herein without departing from the scope of the present invention as defined in the appended claims.

What is claimed is:

1. A sealing ring for sealing two coaxial surfaces relative to one another, comprising:

an annular convolution portion be configured to form a first bending area which has a first annular end and a second annular end with a convex annular surface and a concave annular surface extending therebetween, and said convex surface extending 360° to form a first radial sealing surface facing in a first radial direction;

a first annular leg portion extending outwardly from said first end of said convolution portion to a first free end, and having a second radial sealing surface facing in a second radial direction substantially opposite to said first radial sealing surface of said convolution portion and a first annular bent section located between said second radial sealing surface and said convolution portion, said first annular bent section being configured to form a second bending area; and a second annular leg portion extending outwardly from said second end of said convolution portion to a second free end, and having a third radial sealing surface facing in said second radial direction and a second annular bent section located between said third radial sealing surface and said convolution portion, said second annular bent section being configured to form a third bending area, said first annular bent section being arranged axially between said first radial sealing surface and said second radial sealing surface, said second annular bent section being arranged axially between said first radial sealing surface and said third radial sealing surface, said first and second annular bent sections being further arranged radially between said first radial sealing surface and said second and third radial sealing surfaces such that radial compression of said sealing ring causes bending to primarily occur at said first, second and third bending areas to permit said sealing ring to decrease in its radial direction and increase in its axial direction.

2. A sealing ring according to claim 1, wherein
said first, second and third radial sealing surfaces are curved in longitudinal cross-section.

3. A sealing ring according to claim 1, wherein
said convolution portion, said first leg portion and said second leg portion are integrally formed as a one-piece, unitary member.

4. A sealing ring according to claim 3, wherein
said convolution portion, said first leg portion and said second leg portion are constructed of a resilient, metallic material.

5. A sealing ring according to claim 4, wherein
said first, second and third radial sealing surfaces are coated with a thin layer of a wear coating.

6. A sealing ring according to claim 1, wherein
each of said first and second leg portions has a first outwardly extending frustoconical section located between said convolution portion and said first and second bent portions, respectively.

7. A sealing ring according to claim 6, wherein
each said first frustoconical section is substantially planar in longitudinal cross-section.

8. A sealing ring according to claim 7, wherein
each said first frustoconical section is angled approximately 10° to 60° apart from each other.

9. A sealing ring according to claim 6, wherein
each of said first and second leg portions has a second outwardly extending section located between said first and second bent portions and said first and second radial sealing surfaces, respectively.

10. A sealing ring according to claim 9, wherein
said first and second sections of said first leg portion are contiguous with said first bent portion, and said first and second sections of said second leg portion are contiguous with said second bent portion.

11. A sealing ring according to claim 10, wherein said first section of said first leg portion is angled approximately 120° to 140° from said second section of said first leg portion, and said first section of said second leg portion is angled approximately 120° to 140° from said second section of said second leg portion.

12. A sealing ring according to claim 1, wherein a first surface extends continuously from said first free end of said first leg portion to said second free end of said second leg portion, with said first radial surface being formed thereon.

13. A sealing ring according to claim 12, wherein a second surface extends continuously from said first free end of said first leg portion to said second free end of said second leg portion, with said second and third radial surfaces formed thereon.

14. A sealing ring according to claim 12, wherein said second and third radial surfaces are formed on said first surface.

15. A sealing ring according to claim 14, wherein said first and second free ends are curved inwardly towards each other.

16. A sealing ring according to claim 15, wherein said second and third radial sealing surfaces are formed by said curved free ends.

17. A sealing ring according to claim 16, wherein said second sections of said first and second leg portions are contiguous with said first and second free ends, respectively and diverge away from each other as they extend from said first and second bent portions, respectively.

18. A sealing ring according to claim 17, wherein said second sections are angled relative to each other so that they create additional bending points at their intersection with said curved free ends, respectively.

19. A sealing ring according to claim 1, wherein said convolution portion, said first leg portion and said second leg portion are constructed of at least two plies.

20. A sealing ring according to claim 1, wherein said first radial sealing surface is exposed toward the center of said sealing ring.

21. A sealing ring according to claim 1, wherein said second and third radial sealing surfaces are exposed towards the center of said sealing ring.

22. A sealing ring according to claim 1, wherein said first and second sealing surfaces are substantially circular and have same substantially equal diameters.

* * * * *